US009652608B2

(12) United States Patent
Li et al.

(10) Patent No.: US 9,652,608 B2
(45) Date of Patent: May 16, 2017

(54) SYSTEM AND METHOD FOR SECURING INTER-COMPONENT COMMUNICATIONS IN AN OPERATING SYSTEM

(71) Applicants: Huawei Technologies Co., Ltd., Shenzhen (CN); Singapore Management University, Singapore (SG)

(72) Inventors: Yingjiu Li, Singapore (SG); Daibin Wang, Wuhan (CN); Haixia Yao, Singapore (SG); Ke Xu, Singapore (SG)

(73) Assignees: Huawei Technologies Co., Ltd., Shenzhen (CN); Singapore Management University, Singapore (SG)

( * ) Notice: Subject to any disclaimer, the term of this patent is extended or adjusted under 35 U.S.C. 154(b) by 102 days.

(21) Appl. No.: 14/860,008

(22) Filed: Sep. 21, 2015

(65) Prior Publication Data

US 2016/0092672 A1    Mar. 31, 2016

(30) Foreign Application Priority Data

Sep. 30, 2014 (SG) .................... SG10201406235W

(51) Int. Cl.
- *H04L 29/02* (2006.01)
- *G06F 21/51* (2013.01)
- *G06F 21/71* (2013.01)

(52) U.S. Cl.
CPC .................................. *G06F 21/51* (2013.01)

(58) Field of Classification Search
None
See application file for complete search history.

(56) References Cited

U.S. PATENT DOCUMENTS 6,473,800 B1 * 10/2002 Jerger ..................... G06F 21/52
                                                                 709/224
9,531,713 B2 * 12/2016 Janssen ............... H04L 63/0884
(Continued)

FOREIGN PATENT DOCUMENTS

| CN | 103116716 A | 5/2013 |
|---|---|---|
| CN | 103268438 A | 8/2013 |

OTHER PUBLICATIONS

Bugiel et al., "XManDroid: A New Android Evolution to Mitigate Privilege Escalation Attacks," Center for Advanced Security Research Darmstadt, Technical Report TR-2011-04, pp. 1-17, Technische Universität Darmstadt, Darmstadt, Germany (Apr. 30, 2011).

(Continued)

*Primary Examiner* — Venkat Perungavoor
(74) *Attorney, Agent, or Firm* — Leydig, Voit & Mayer, Ltd.

(57) ABSTRACT

System and methods for securing inter-component communications in an operating system are provided. Systems and methods provided herein secure inter-component communications in an operating system by selectively generating instances when inter-component communication requests occur, whereby each of the generated instances are attached to a newly created blocked permissions list. System and methods further manage the invocation of Application Programming Interfaces by applications or instances in the operating system by determining whether the invocation of the Application Programming Interface is allowed or declined based on the blocked permissions list and default permission list associated with each invoking application or instance.

15 Claims, 7 Drawing Sheets

(56) References Cited

U.S. PATENT DOCUMENTS

| | | | |
|---|---|---|---|
| 2012/0143811 A1* | 6/2012 | Proctor | G06N 5/025 706/48 |
| 2013/0125210 A1 | 5/2013 | Felt et al. | |
| 2014/0280196 A1* | 9/2014 | Jung | H04L 67/02 707/741 |
| 2014/0282968 A1* | 9/2014 | Aboughanaima | H04L 63/08 726/7 |
| 2016/0232365 A1* | 8/2016 | Oh | G06F 21/51 |

OTHER PUBLICATIONS

Dietz et al., "QUIRE: Lightweight Provenance for Smart Phone Operating Systems," Computing Research Repository, (Feb. 2011).
Felt et al., "Permission Re-Delegation: Attacks and Defenses," SEC'11 Proceedings of the 20$^{th}$ USENIX Conference on Security, USENIX Association, Berkley, California (2011).

* cited by examiner

SYSTEM AND METHOD FOR SECURING INTER-COMPONENT COMMUNICATIONS IN AN OPERATING SYSTEM

CROSS-REFERENCE TO RELATED APPLICATION

This application claims priority to Singapore Patent Application No. SG10201406235W, filed with the Singapore Patent Office on Sep. 30, 2014, which is hereby incorporated by reference in its entirety.

TECHNICAL FIELD

This invention relates to a system and method for securing inter-component communications in an operating system such as a mobile device operating system. More particularly, this invention relates to a system and method for securing inter-component communications in an operating system by selectively generating instances when inter-component communication requests occur, whereby each of the generated instances are attached to a newly created blocked permissions list. Still more particularly, this invention relates to a system and method that further manages the invocation of Application Programming Interfaces by applications or instances in the operating system. The system and method determines whether the invocation of the Application Programming Interface is allowed or declined based on the blocked permissions list and default permission list associated with each invoking application or instance.

BACKGROUND

An operating system designed for mobile devices such as smartphones or tablet computers may be roughly divided into four main layers. The core of the operating system, or the base layer of the four layers in the operating system, is the kernel layer. The kernel layer is followed by the middleware layer in which, e.g., the Java libraries and the runtime machine reside. The second topmost layer comprises the application framework layer, and the topmost layer comprises the application layer. Each application residing in the application layer of the operating system comprises four component types. The first component type is an activity component that defines an application's user interface, the second component type is a service component that performs background processing, the third component type is a content provider component that stores and shares data using relational database interfaces, and the fourth component type is a broadcast receiver component that acts as a mailbox for messages from other applications.

When one component initiates communication with another, this communication process is known as inter-component communication ("ICC"). In an ICC process, a message object that contains a destination or target component address and data will be sent from the initiating component to a target component. The action associated with each ICC varies depending on the component that is the target of the ICC. As an example, a first application is set up with a first activity component and a first service component and a second application is set up with a second broadcast receiver component. In this example, the first activity component in the first application may initiate an ICC targeting the first service component to control the operation of the first service component in the first application. It should be noted that the inter-component communications are not limited to communications between components residing in a single application only. ICCs may also be used to facilitate the interaction between components in two different applications. Returning to the previous example, this would mean that the first activity component in the first application may initiate an ICC targeting the second broadcast receiver component in the second application to broadcast any messages that may be contained within the first application using the broadcast receiver of the second application.

To increase the portability of applications, the libraries in the middleware layer implement device-specific functions so that applications in the application layer and software modules in the application framework layer need not concern themselves with the variations between devices that utilize such an operating system. However, this results in an increase in the overall complexity of the operating system. Due to the increased complexity of the operating system, most application developers tend to overlook security loopholes. These loopholes may be exploited by malicious applications or services programmed to carry out malicious tasks or execute malicious codes. For example, these malicious applications or services may exploit the inter-component communications to gain access to sensitive components or data residing within applications.

By default, such operating systems have in place a security policy that protects applications and data at the ICC level. In particular, the operating system is provided with a reference monitor that resides at the application framework layer. The reference monitor provides mandatory access control (MAC) enforcement of how applications are to access components. In its simplest form, access to each component is restricted by assigning it an access permission label. These permission labels are typically assigned by the developers of the application and are usually not modifiable by a general user of the application. When a component initiates an ICC, the reference monitor checks the collection of permission labels assigned to the application that contains the initiating component as the initiating component will inherit the permission labels of the application. If the collection contains all the permission labels required by the target component of the ICC, the reference monitor allows the ICC to continue. Alternatively, if any required label is not in the initiating component's collection, the establishment of the ICC is denied. In having such a security policy in place, the developer of the application is actually the only person who is able to define the application's security policy or in particular, each component's required permission label or the list of permission labels associated with the particular application.

Throughout the years, various permission management applications have been developed to address the shortcomings of existing permission controls for such operating systems. These permission management applications provide for dynamic permission management which allow a user to independently revoke and grant some permission labels associated with certain applications after the applications have been installed. In general, these permission management applications may be broadly grouped into four categories, application package modification based applications, Read-Only-Memory based applications, Application Ops based applications and Root based application. These various types of applications attempt to address some of the shortcomings of existing permission controls for such operating systems.

SUMMARY

An embodiment is provided herein that has as a first advantage that the permission management policy of such operating systems is strengthened and shielded against malicious attacks, in particular against privilege escalation attacks as the mapping of inter-component communications and invocations of Application Programming Interfaces are all managed by the invention. An embodiment is provided herein that has as a second advantage that the size of the new unified blocked permission list associated with the new instance is limited to the size of the union of the blocked permission lists associated with the initiating component and the target component. As such, this minimizes the invention's impact on the normal operation of existing applications. An embodiment is provided herein that has as a third advantage that the invention may be easily deployed in such existing operating systems as the modules that make up the invention reside in the application framework layer of such an operating system.

A system is provided herein that has a processing unit and media readable by the processing unit. The media is configured to store instructions that when executed by the processing unit, cause the processing unit to intercept, using a reference module, an inter-component communication request from the first application to the second application wherein the first application is associated with a first blocked permission list, and the second application is associated with a second blocked permission list. The first and second blocked permission lists are provided by a user of the operating system and are stored in a blocked permission database. The instructions when executed by the processing unit also directs the processing unit to determine if a new instance is to be created, and if a new instance is to be created by retrieving the first blocked permission list and the second blocked permission list from the blocked permission database, by determining if the first blocked permission list is a subset of the second blocked permission list, and if the first blocked permission list is determined not to be a subset of the second blocked permission list, notify the reference monitor to create the new instance, and calculate a new unified blocked permission list that is to be associated with the new instance using the first blocked permission list and the second blocked permission list. In this embodiment of the invention, the reference monitor and the blocked permission database both reside in the application framework layer of the operating system and a blocked permission service resides in the application framework layer of the operating system.

In accordance with an embodiment of the invention, the instructions to calculate the new unified blocked permission list comprise additional instructions for directing the processing unit to unify the first blocked permission list and the second blocked permission list to form the unified blocked permission list.

In accordance with an embodiment of the invention, the instructions further comprise additional instructions for directing the processing unit to instruct, using the reference monitor, an instance creation module residing in the application framework layer to create the new instance. The additional instructions also direct the processing unit to associate the new unified blocked permission list to the new instance and to store, using the blocked permission service, the unified blocked permission list in the blocked permission database.

In accordance with embodiments of the invention, the instructions further comprise additional instructions for directing the processing unit to establish, using the reference monitor, an inter-component communication between the first application and the new instance.

In accordance with an embodiment of the invention, the instructions further comprise additional instructions for directing the processing unit to intercept, using a privilege Application Programming Interface decision module, a privileged Application Programming Interface request invoked by an application or an instance, wherein the privileged Application Programming Interface is provided with a required permission list. The additional instructions also direct the processing unit to retrieve, using the blocked permission service, a blocked permission list associated with the invoking application or instance from the blocked permission database. The processing unit is then directed by the additional instructions to determine, using the privilege Application Programming Interface decision module, if the required permission list matches with the retrieved blocked permission list and if a match does not exist between the required permission list and the retrieved blocked permission list, the processing unit is directed to retrieve a permission list associated with the invoking application or instance from a permission database. The additional instructions then direct the processing unit to determine, using the privilege Application Programming Interface decision module, if the required permission list matches with the retrieved permission list, and if a match exists between the required permission list and the retrieved permission list, the processing unit is directed to allow the invocation of the privileged Application Programming Interface to proceed. In this embodiment of the invention, the Application Programming Interface decision module and the permission database both reside in the application framework layer.

BRIEF DESCRIPTION OF THE DRAWINGS

The above advantages and features in accordance with this invention are described in the following detailed description and are shown in the following drawings.

DESCRIPTION OF EMBODIMENTS

This invention relates to systems and methods for securing inter-component communications in an operating system, such as a mobile device operating system. More particularly, this invention relates to systems and methods for securing an inter-component communication ("ICC") in an operating system by selectively generating instances when ICC requests occur, whereby each of the generated instances are attached to a newly created blocked permissions list. Still more particularly, this invention relates to systems and methods that further manage the invocation of an Application Programming Interface ("API") by applications or instances in the operating system. The systems and methods determine whether the invocation of the API is allowed or declined based on the blocked permissions list and default permission list associated with each invoking application or instance.

Figure 1:
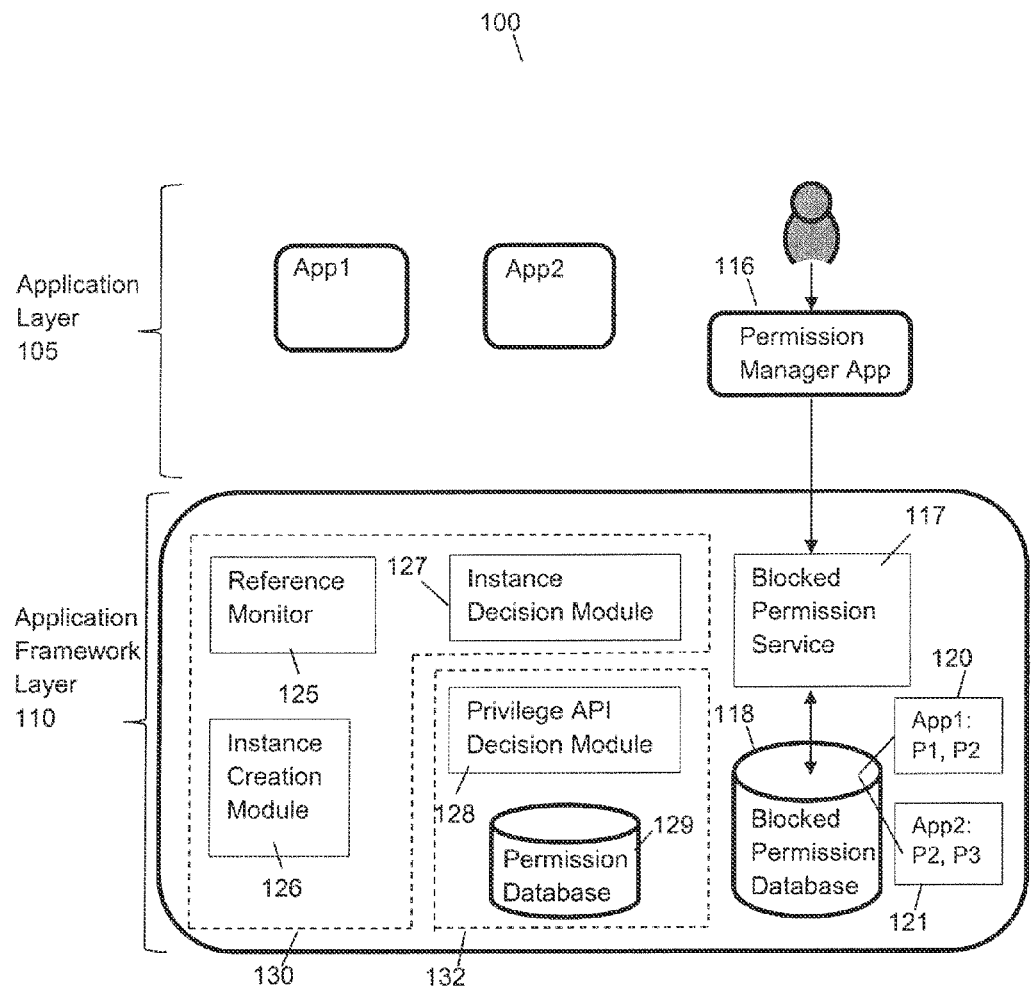
FIG. 1 illustrates a block diagram of the application layer and the application framework layer of an operating system together with the modules in accordance with an embodiment of the invention.

FIG. 1 illustrates operating system 100 that includes application layer 105 and application framework layer 110 having the respective software modules in accordance with an embodiment of the invention. As illustrated in FIG. 1, system 100 includes reference monitor 125, applications App1, App2 and four new function modules. Reference monitor 125 may be modified from existing development code for such operating systems. Reference monitor 125 is used to monitor new activities when a new activity is started in system 100 and optionally, may be used to stop the activity call and return a canned result.

The new function modules in system 100 are instance creation module 126, instance decision module 127, privilege API decision module 128 and blocked permission service 117. One skilled in the art will recognize that these four new function modules may be written using development codes for such operating systems or may be modified from existing classes or components coded for such operating systems to perform the processes required by each module as described below.

Instance creation module 126 is used by system 100 to create application instances at runtime and as such, instance creation module 126 is added to Activity Manager Service 130 in application framework layer 110. As for instance decision module 127, this module is added to Activity Manager Service 130 in application framework layer 110 and is used to determine whether a new instance should be created based on specific relevant blocked permission lists.

The other function module added to Package Manager Service 132 is privilege API decision module 128 which is used to determine whether the invocation of a privileged API by an application or instance is allowed or denied. From hereinafter, one skilled in the art will recognize that the term privileged API refers to an API that is invoked by an application or instance that possesses a list of required permission labels to access specific sensitive resources in such operating systems.

In other words, in such existing operating systems, when a privileged API is invoked by an application or an instance, the security policy of the existing operating system will carry out a check using the permission lists contained in permission database 129 to ascertain whether the invoking instance or application possesses the necessary permission labels required by the privileged API. The invoking instance or application may possess a plurality of permission labels but in order to access a particular resource on the operating system, the invoking instance or application will have to possess the required permission label associated with that particular resource and as contained in the privileged API's required permission list. If the check returns a positive result, the privileged API will be invoked by the instance or application, and if the check returns a negative result, the invocation of the privilege API will be rejected.

In addition to having permission database 129 that stores permission lists associated with existing applications and/or instances, system 100 is also provided with a new storage module, which is blocked permission database 118 that may be accessed by blocked permission service 117. Blocked permission service 117 allows user 115 to modify the contents of blocked permission lists stored in blocked permission database 118 via permission manager app 116. The purpose of blocked permission database 118 is to store the lists of blocked permissions associated with each installed application in system 100. For example, if a camera application is associated with a blocked permission for reading a phonebook application, this would mean that the camera application cannot access the phonebook application at runtime. If a particular application possesses a great number of blocked permissions, this would mean that the function of that particular application is actually quite limited.

In operation, this would mean that applications and instances in system 100 would be associated with two different types of permission lists. The first type would be the conventional permission list that sets out the various permission labels possessed by the application or instance as declared by the developers of the application or instance while the second type would be the list of blocked permissions associated with the application or instance as defined by a user of system 100. After an application is installed in system 100, the user may configure the blocked permission list associated with the application using permission manager app 116. If so required, permission manager app 116 may also be used to block permissions declared by an application's developer or access to other sensitive resources on system 100.

In the embodiment shown in FIG. 1, App1 is shown to be associated with blocked permission list 120 which contains blocked permissions P1 and P2 while App2 is shown to be associated with blocked permission list 121 which contains blocked permissions P2 and P3. What this means is that in system 100, App1 will not be able to access resources that require permission labels P1 or P2 as App1 is associated with blocked permissions P1 and P2 while App2 will not be able to access resources that require permission labels P2 or P3 and App2 is associated with blocked permissions P2 and P3.

Figure 2:
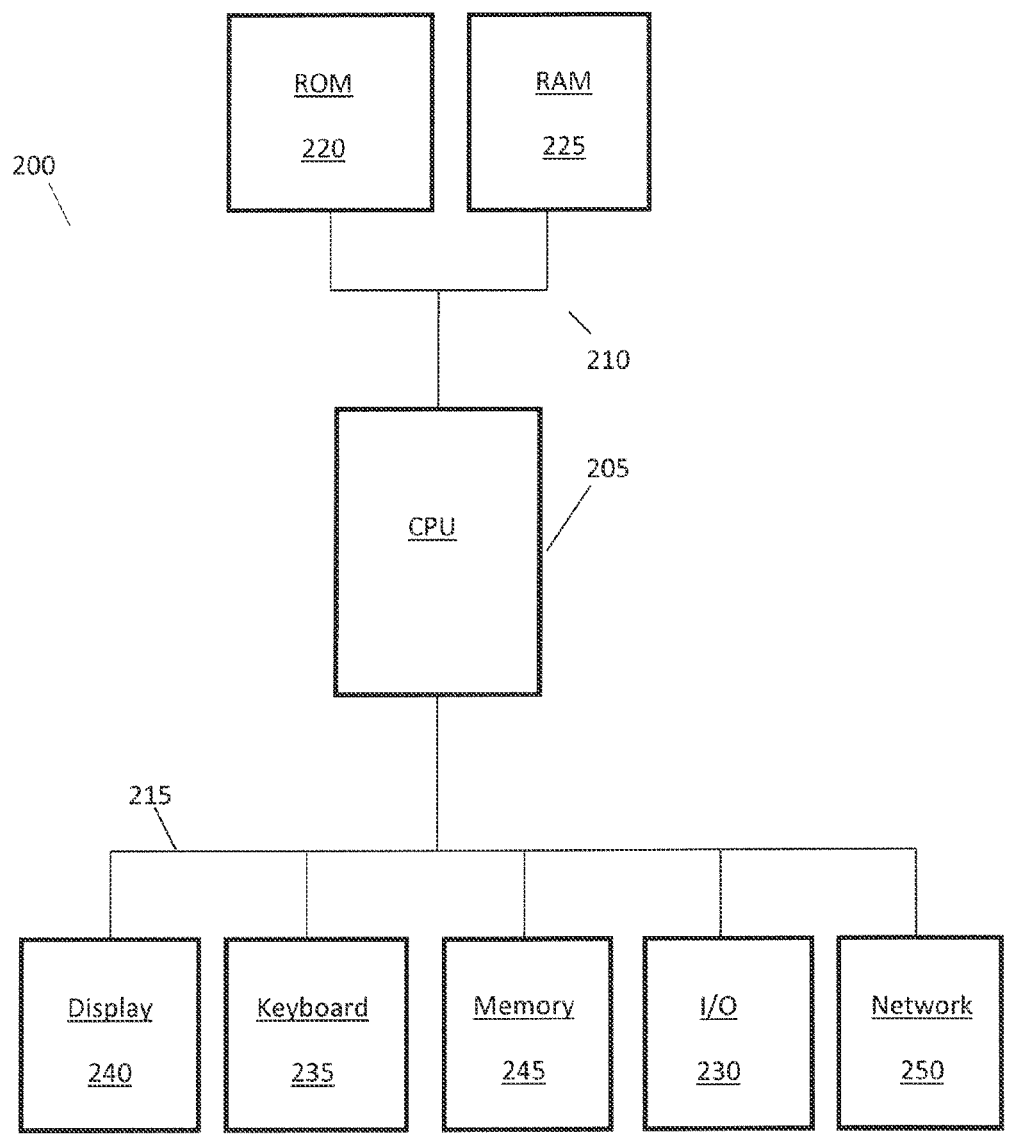
FIG. 2 illustrates a block diagram representative of processing systems providing embodiments in accordance with an embodiment of the invention.

Processes provided by instructions stored in a media are executed by a processing unit in a computer system. A computer system may be provided in one or more mobile devices to provide this invention. The instructions may be stored as firmware, hardware, or software. FIG. 2 illustrates an example of such a processing system. Processing system 200 may be the processing system in the mobile devices that execute the instructions to perform the processes for providing a method and/or system in accordance with an embodiment of this invention. One skilled in the art will recognize that the exact configuration of each processing system may be different and the exact configuration of the processing system in each mobile device may vary and FIG. 2 is given by way of example only.

Processing system 200 includes Central Processing Unit (CPU) 205. CPU 205 is a processor, microprocessor, or any combination of processors and microprocessors that execute instructions to perform the processes in accordance with the present invention. CPU 205 connects to memory bus 210 and Input/Output (I/O) bus 215. Memory bus 210 connects CPU 205 to memories 220 and 225 to transmit data and instructions between memories 220, 225 and CPU 205. I/O bus 215 connects CPU 205 to peripheral devices to transmit data between CPU 205 and the peripheral devices. One skilled in the art will recognize that I/O bus 215 and memory bus 210 may be combined into one bus or subdivided into many other busses and the exact configuration is left to those skilled in the art.

A non-volatile memory 220, such as a Read Only Memory (ROM), is connected to memory bus 210. Non-volatile memory 220 stores instructions and data needed to operate various sub-systems of processing system 200 and to boot the system at start-up. One skilled in the art will recognize that any number of types of memory may be used to perform this function.

A volatile memory 225, such as Random Access Memory (RAM), is also connected to memory bus 210. Volatile memory 225 stores the instructions and data needed by CPU 205 to perform software instructions for processes such as the processes required for providing a system in accordance with an embodiment of this invention. One skilled in the art will recognize that any number of types of memory may be used as volatile memory and the exact type used is left as a design choice to those skilled in the art.

I/O device 230, keyboard 235, display 240, memory 245, network device 250 and any number of other peripheral devices connect to I/O bus 215 to exchange data with CPU 205 for use in applications being executed by CPU 205. I/O device 230 is any device that transmits and/or receives data from CPU 205. Keyboard 235 is a specific type of I/O that receives user input and transmits the input to CPU 205. Display 240 receives display data from CPU 205 and display images on a screen for a user to see. Memory 245 is a device that transmits and receives data to and from CPU 205 for storing data to a media. Network device 250 connects CPU 205 to a network for transmission of data to and from other processing systems.

Figure 3:
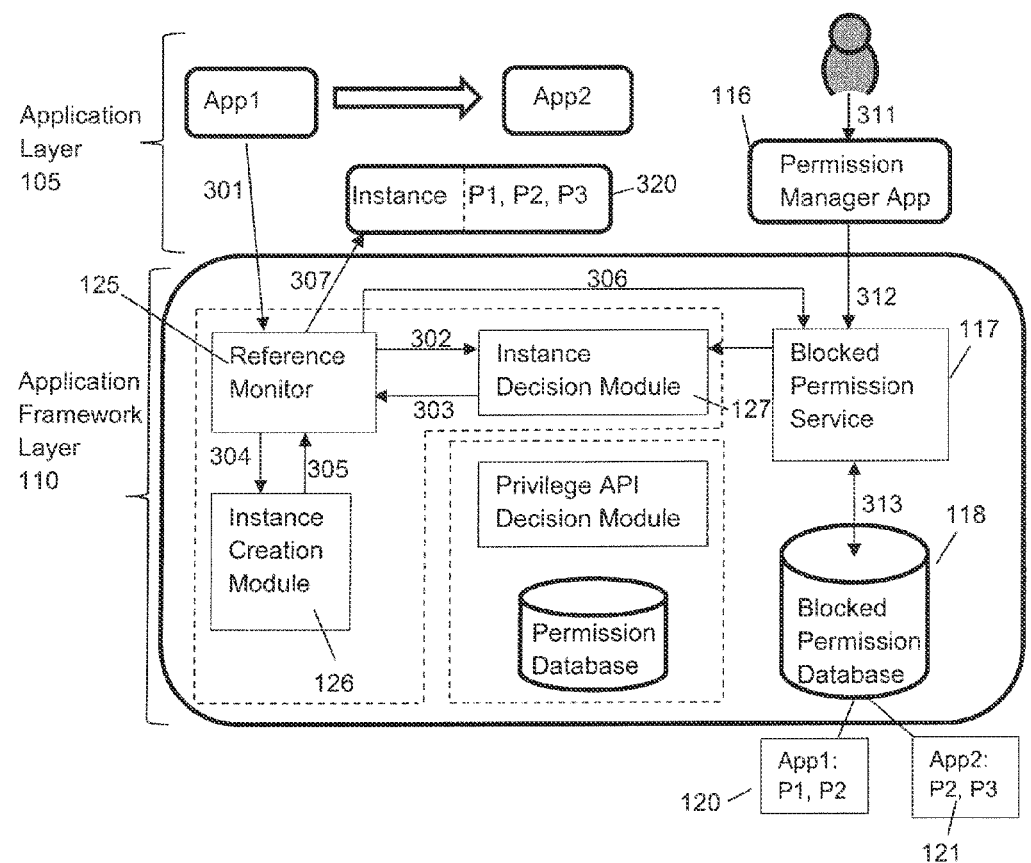
FIG. 3 illustrates a block diagram of an operating system together with modules in accordance with an embodiment of the invention for securing inter-component communications in the operating system.

FIG. 3 illustrates a block diagram of system 100 that shows the steps for securing an ICC from application App1 to application App2. As previously shown in FIG. 1, system 100 is provided with two applications, which are applications App1 and App2. These two applications must first be set up by a user of system 100. At step 311, the user of system 100 who wishes to amend the blocked permission lists of applications App1 and/or App2 will first access permission manager app 116. Permission manager app 116 is then used to manage the blocked permission lists for applications App1 and App2 as stored in blocked permission database 118. This is shown in steps 312 and 313. In this embodiment, it is shown that application App1 is associated with blocked permission list 120 that has labels P1 and P2 while application App2 is associated with blocked permission list 121 that has labels P2 and P3. One skilled in the art will recognize that any type of permission labels related to such operating systems may be added as blocked permission labels to the blocked permission lists that are stored in blocked permission database 118 without departing from this invention and that blocked permission database 118 may be used to store any amount of blocked permission lists.

When an ICC request is initiated by application App1 targeting application App2, this ICC request will be intercepted by reference monitor 125. This occurs at step 301. One skilled in the art will recognize that reference monitor 125 has been modified from an existing Reference Monitor commonly used in development environments for such operating systems so that reference monitor 125 is able to communicate with instance creation module 126 and instance decision module 127. Reference monitor 125 then transmits the intercepted ICC request to instance decision module 127 at step 302. Instance decision module 127 will then determine whether a new instance is to be created. If instance decision module 127 decides that a new instance need not be created, reference monitor 125 will then allow the ICC to be established between applications App1 and App2. If instance decision module 127 decides that a new instance is required, instance decision module 127 will proceed to calculate a new unified blocked permission list based on the blocked permission lists of the initiating application and the target application, i.e. blocked permission lists 120, 121. The new unified blocked permission list will then be associated with the new instance which is hereinafter identified as new instance 320.

The decision made by instance decision module 127 will then be sent to reference monitor 125 at step 303. For the creation of new instance 320, reference monitor 125 will send a new instance request to instance creation module 126 at step 304. Instance creation module 126 will then generate new instance 320 with the assistance of a process creation API found in the framework for such operating systems. This process creation API uses the "Zygote" process, which is a core process in such operating systems, to fork any new process.

Once new instance 320 is generated, new instance 320 will be accorded a process identity (PID). The PID of new instance 320 is then sent to reference monitor 125 at step 305. At step 306, reference monitor 125 will send a user identity (UID), PID and new unified blocked permission list of new instance 320 to block permission service 312. An ICC is then established between application App1 and new instance 320.

Figure 4:
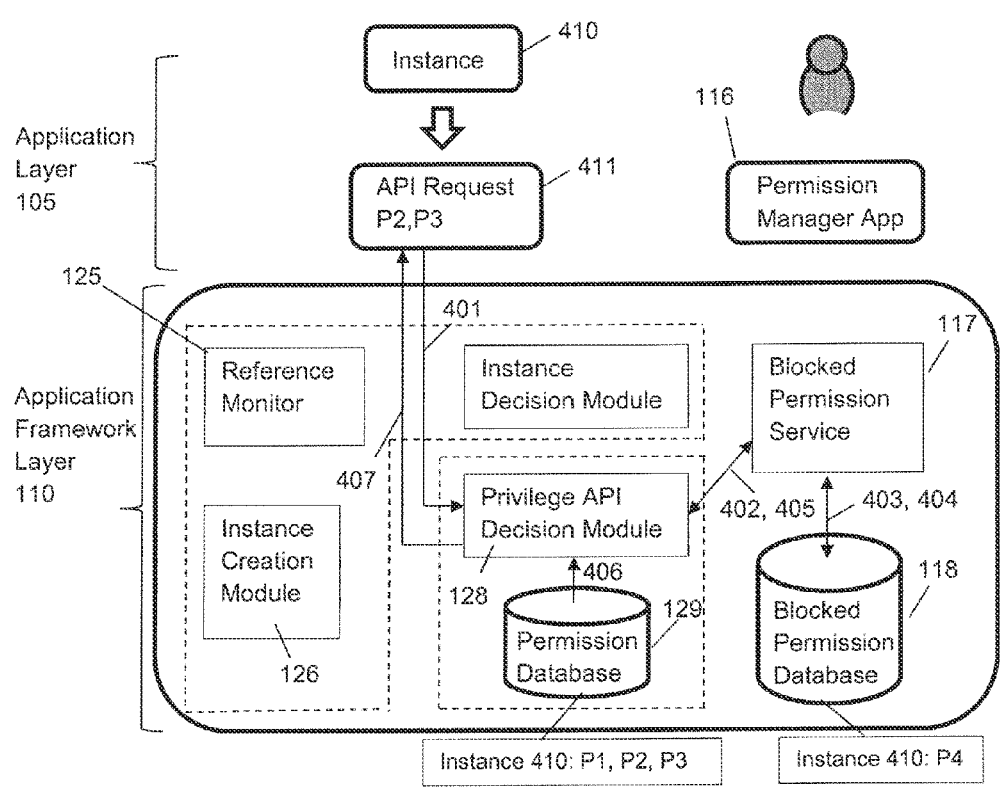
FIG. 4 illustrates a block diagram of an operating system together with modules in accordance with an embodiment of the invention for securing invocations of Application Programming Interfaces in the operating system.

FIG. 4 illustrates another embodiment of the invention which shows the steps for securing invocations of Application Programming Interfaces (APIs) by applications or instances in system 100. When an instance or an application invokes a privilege API in system 100, the privileged API request is intercepted at step 401 by privilege API decision module 128. Privilege API decision module 128 will then liaise with blocked permission database 118 and permission database 129 at steps 402-406 to determine whether the invoking application or instance has the required permissions to invoke the privilege API. Privilege API decision module 128 will then send its decision to the application or instance that invoked the privilege API request. If it is determined that the instance or application has the required permissions, the API will then be invoked else, the invocation request will be rejected.

In the example illustrated in FIG. 4, it is shown that instance 410 invokes privileged API request 411. In this example, it is also shown that privileged API 411 request requires permission labels P2 and P3. After privileged API request 411 has been intercepted at step 401, privilege API decision module 128 will obtain the blocked permission list associated with instance 410 at steps 402-404. In this example, it is shown that instance 410 is associated with blocked permission label P4. As the permission labels required by privileged API request 411 does not match with the blocked permission label associated with instance 410, privilege API decision module 128 will proceed to step 406. In other words, there is no conflict between the permission labels required by privileged API request 411 and the permission labels that are off limits to privileged APIs invoked by instance 410.

At step 406, privilege API decision module 128 will compare the permission labels required by privileged API request 411 with the permission lists associated with instance 410 as stored in permission database 129. If there is a match, the invocation of privileged API 411 request by instance 410 will be allowed to proceed else the invocation of the API will be rejected. In this example, as instance 410 is shown to be associated with permission labels P1, P2 and P3, this would mean that a match would occur at step 406, i.e. privileged API 411 request requires permission labels P2 and P3 and these labels are associated with instance 410. As such, the invocation of privileged API 411 will be allowed to proceed.

In order to provide such a system or method, a process is needed for securing an inter-component communication call from a first application to a second application in such an operating system and for securing the invocation of privilege APIs. The following description and FIGS. 5-7 describe embodiments of processes that provide such a securing process in accordance with this invention.

Figure 5:
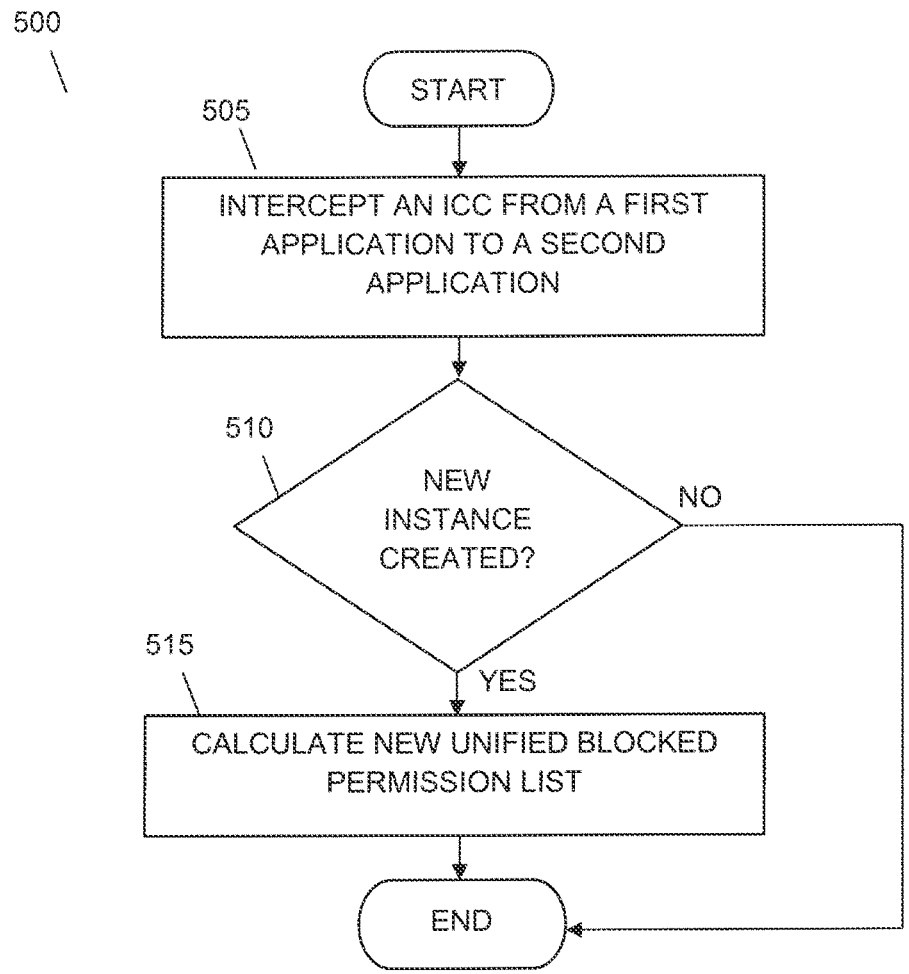
FIG. 5 illustrates a flow diagram of a process for securing an inter-component communication between a first application and a second application in accordance with an embodiment of the invention.

FIG. 5 illustrates process 500 that is performed by a computer system in a mobile device to secure an ICC from a first application to a second application in accordance with an embodiment of this invention. Process 500 begins in step 505 by intercepting an ICC request from a first application. The interception of the ICC request may be carried out by reference monitor 125 as previously discussed. Process 500 then progresses to step 510. At step 510, the intercepted ICC request is sent from reference monitor 125 to instance decision module 127. Instance decision module 127 will determine whether a new instance is to be created based on the blocked permission lists associated with the first application and the second application. If a new instance is to be created, process 500 progresses to step 515 whereby instance decision module 127 will calculate a new blocked permission list for the new instance based on the blocked permission lists associated with the first and second applications. Process 500 then ends. The processes carried out by instance decision module 127 will be described later with reference to FIG. 6. Alternatively, if a new instance is not to be created, process 500 then ends and the ICC will be established between the first application and the second application.

Figure 6:
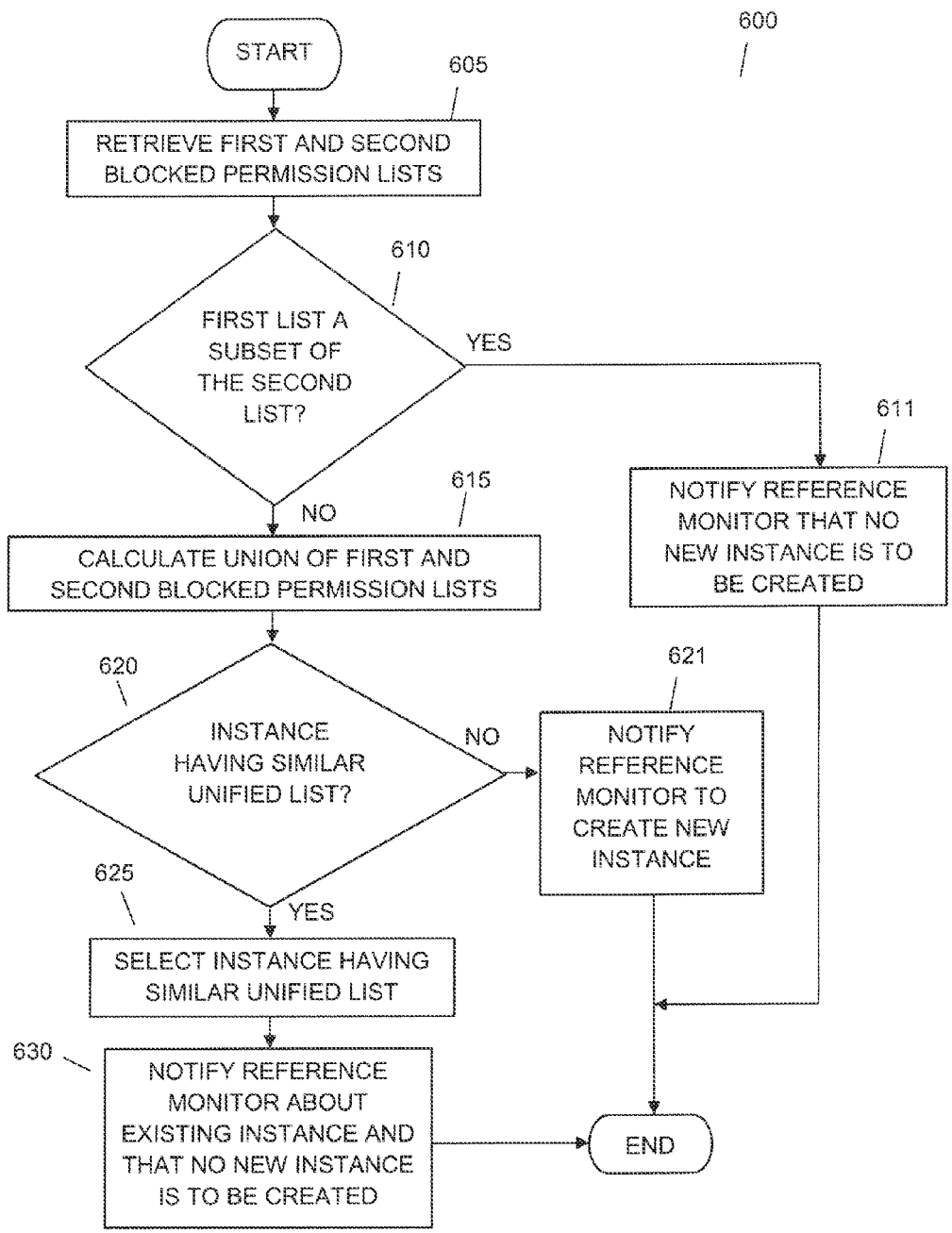
FIG. 6 illustrates a flow diagram of a process in an instance decision module in accordance with an embodiment of the invention for determining whether a new instance is to be created.

FIG. 6 illustrates process 600 that is performed by a computer system in a mobile device to determine whether a new instance is to be created and if a new instance is to be created, to calculate a new blocked permission list that is to be associated with the new instance. In an embodiment of the invention, process 600 may be carried out by instance device module 127. Process 600 begins at step 605 by analysing the intercepted ICC request to obtain the first and second applications' blocked permission lists, i.e. the caller's and target's blocked permission lists from blocked permission database 118. In an embodiment of the invention, the retrieval of the relevant blocked permission lists may be carried out by first retrieving the caller's and target's UID and PID from the intercepted ICC request. The associated blocked permission lists may then be retrieved from blocked permission database 118 using the retrieved UID and PID of the caller and the target. Process 600 then progresses to step 610. At step 610, process 600 compares the blocked permission list of the first application with the blocked permission list of the second application. If the blocked permission list of the first application is a subset of the blocked permission list of the second application, process 600 progresses to step 611 whereby process 600 will send a notification to reference monitor 125 notifying reference monitor 125 that no new instance needs to be created. Process 600 then ends. Alternatively, if the blocked permission list of the first application is not a subset of the blocked permission list of the second application, process 600 progresses to step 615.

What this means is that process 600 will essentially not create a new instance if process 600 determines that the second application has lesser or equal access to sensitive resources in the operating system as compared to the first application, that is when the blocked permission list of the first application is a subset of the blocked permission list of second application. A new instance will only be created at step 610 by process 600 if the second application is able to access more sensitive resources in the operating system as compared to the first application.

At step 615, process 600 will then calculate the new blocked permission list that is to be attached to the newly created instance. This is done by unifying the blocked permission list of the first application with the blocked permission list of the second application. With regard to the blocked permission lists 120, 121 as illustrated in FIG. 1, what this means is that the union of these two blocked permission lists would result in a unified blocked permission list having the blocked permission labels P1, P2 and P3.

Process 600 would then carry out a check amongst all the existing instances in the operating system at step 620 to determine whether the second application has an existing instance having the same unified blocked permission list as that created in step 615. If process 600 determines that such an instance does not exist in the operating system, process 600 will then progress to step 621. At step 621, process 600 will notify reference monitor 125 that a new instance is to be created and process 600 then ends. As mentioned above, the creation of the new instance is carried out by processes in instance creation module 126.

Alternatively, if process 600 determines that such an instance exists in system 100, process 600 would then proceed to step 625. At step 625, process 600 will select the existing instance associated with the second application and having the same unified blocked permission list as that previously created in step 615. Process 600 will then notify reference monitor 125 about the details of the existing instance, such as the name of the instance, the instance's UID, PID, etc. so that reference monitor 125 may retrieve the identified instance at a later stage. All this occurs at step 630. Process 600 will also at this step notify reference monitor 125 that a new instance will not be created and process 600 will then end.

Figure 7:
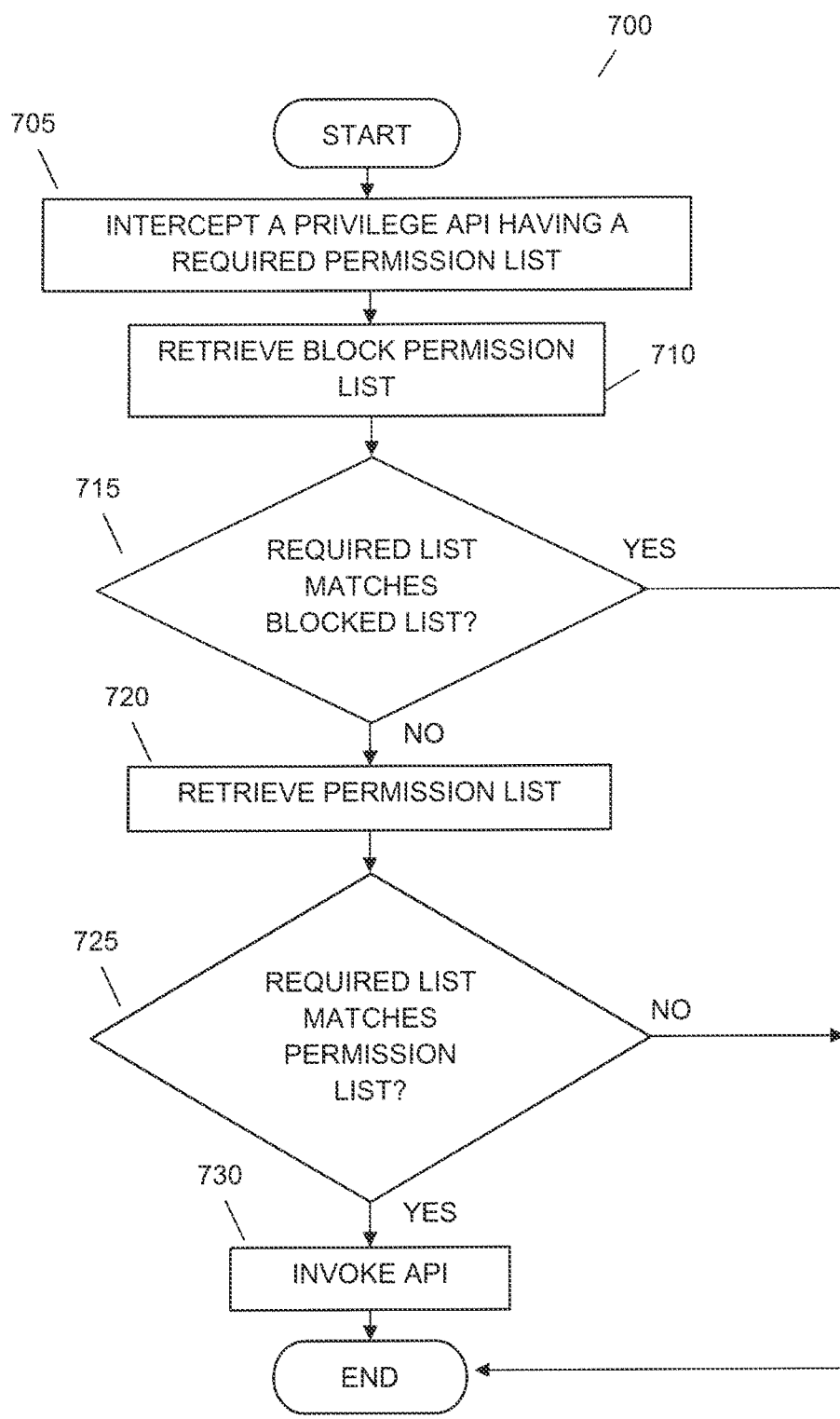
FIG. 7 illustrates a flow diagram of a process in a privilege Application Programming Interface decision module in accordance with an embodiment of the invention for determining whether a privileged Application Programming Interface may be invoked.

FIG. 7 illustrates process 700 that is performed by a computer system in a mobile device to determine whether a privileged API may be invoked by an instance or an application. In accordance with an embodiment of the invention, such a process may be carried out by privilege API decision module 128. Process 700 begins at step 705 whereby a privileged API invocation request is intercepted by process 700. The intercepted request will include a list of permission labels required by the privileged API in order for the request to succeed, and the invoking instance's UID and PID. At step 710, process 700 then uses the invoking instance's UID and PID to retrieve the blocked permission list associated with the invoking instance from blocked permission database 118. In an embodiment of the invention, the requesting and the receiving of the required information may be carried out using blocked permission service 117. At step 715, process 700 compares the retrieved blocked permission list with the permission labels required by the privileged API. If there is a match, process 700 will end and the invocation of the privileged API will be ended as well. Alternatively, if the retrieved blocked permission list does not match with the permission labels required by the privileged API, process 700 will proceed to step 720.

At step 720, process 700 will retrieve the permission list associated with the invoking instance from permission database 129. In an embodiment of the invention, the permission list may be retrieved using the invoking instance's UID and PID. If the retrieved permission list contains permission labels that match with the permission labels required by the privileged API, process 700 will proceed to step 730. At step 730, process 700 approves the invocation of the privileged API and the invocation process is allowed to continue. Process 700 then ends. Alternatively, if the retrieved permission list does not contain permission labels that match with the permission labels required by the privileged API, process 700 will end and the invocation of the privileged API will end as well.

Although process 700 was described above with reference to an instance, one skilled in the art will recognize that process 700 may be applied to a privileged API request invoked by an application without departing from this invention.

The above is a description of embodiments of systems and processes in accordance with the present invention as set forth in the following claims. It is envisioned that others may and will design alternatives that fall within the scope of the following claims.

What is claimed is:

1. A method for securing an inter-component communication request from a first application to a second application in an operating system having an application framework layer, the method comprising:
   intercepting the inter-component communication request from the first application to the second application wherein the first application is associated with a first blocked permission list, and the second application is associated with a second blocked permission list, wherein the first and second blocked permission lists are provided by a user of the operating system and are stored in a blocked permission database residing in the application framework layer;
   retrieving the first blocked permission list and the second blocked permission list from the blocked permission database;
   determining if the first blocked permission list is a subset of the second blocked permission list;
   instructing a reference monitor to create a new instance when the first blocked permission list is not a subset of the second blocked permission list; and
   calculating a new unified blocked permission list that is to be associated with the new instance using the first blocked permission list and the second blocked permission list when the reference monitor is instructed to create the new instance.

2. The method of claim 1, wherein calculating the new unified blocked permission list comprises unifying the first blocked permission list and the second blocked permission list to form the unified blocked permission list.

3. The method of claim 1 further comprising:
   instructing an instance creation module residing in the application framework layer to create the new instance;
   creating the new instance and associating the new unified blocked permission list with the new instance; and
   storing the new unified blocked permission list in the blocked permission database.

4. The method of claim 3 further comprising:
   establishing an inter-component communication between the first application and the new instance.

5. The method of claim 4 further comprising:
   intercepting a privileged Application Programming Interface (API) request invoked by an application or an instance, wherein the privileged API request is provided with a required permission list;
   retrieving a blocked permission list associated with the invoking application or instance from the blocked permission database;
   determining if the required permission list matches with the retrieved blocked permission list;
   retrieving a permission list associated with the invoking application or instance from a permission database residing in the application framework layer when a match does not exist between the required permission list and the retrieved blocked permission list;
   determining if the required permission list matches with the retrieved permission list; and
   allowing the invocation of the privileged Application Programming Interface to proceed when the required permission list matches with the retrieved permission list.

6. A system for securing an inter-component communication request from a first application to a second application in an operating system having an application framework layer, the system comprising:
   a processing unit; and
   media readable by the processing unit, the media having stored thereon instructions that when executed by the processing unit, cause the processing unit to:
   intercept, using a reference monitor residing in the application framework layer, the inter-component communication request from the first application to the second application wherein the first application is associated with a first blocked permission list, and the second application is associated with a second blocked permission list, wherein the first and second blocked permission lists are provided by a user of the operating system and are stored in a blocked permission database residing in the application framework layer;
   retrieve the first blocked permission list and the second blocked permission list from the blocked permission database,
   determine if the first blocked permission list is a subset of the second blocked permission list,
   notify the reference monitor to create the new instance when the first blocked permission list is determined not to be a subset of the second blocked permission list; and
   calculate a new unified blocked permission list that is to be associated with the new instance using the first blocked permission list and the second blocked permission list when the reference monitor is notified to create the new instance.

7. The system of claim 6, wherein the instructions to calculate the new unified blocked permission list comprise instructions for directing the processing unit to unify the first blocked permission list and the second blocked permission list to form the unified blocked permission list.

8. The system of claim 6, wherein the media has stored thereon further instructions that when executed by the processing unit, cause the processing unit to:
   instruct, using the reference monitor, an instance creation module residing in the application framework layer to create the new instance;
   create the new instance, using the instance creation module, and to associate the new unified blocked permission list to the new instance; and store, using the blocked permission service, the new unified blocked permission list in the blocked permission database.

9. The system of claim 8 wherein the media has stored thereon further instructions that when executed by the processing unit, cause the processing unit to:
establish, using the reference monitor, an inter-component communication between the first application and the new instance.

10. The system of claim 9 wherein the media has stored thereon further instructions that when executed by the processing unit, cause the processing unit to:
intercept, using a privilege Application Programming Interface decision module residing in the application framework layer, a privileged Application Programming Interface request invoked by an application or an instance, wherein the privileged Application Programming Interface request is provided with a required permission list;
retrieve, using the blocked permission service, a blocked permission list associated with the invoking application or instance from the blocked permission database;
determine, using the privilege Application Programming Interface decision module, if the required permission list matches with the retrieved blocked permission list;
retrieve a permission list associated with the invoking application or instance from a permission database residing in the application framework layer when a match does not exist between the required permission list and the retrieved blocked permission list;
determine, using the privilege Application Programming Interface decision module, if the required permission list matches with the retrieved permission list; and
allow the invocation of the privileged Application Programming Interface to proceed when a match exists between the required permission list and the retrieved permission list.

11. A computer-readable storage medium comprising instructions which, when executed by a computer, cause the computer to carry out the following steps
intercepting the inter-component communication request from the first application to the second application wherein the first application is associated with a first blocked permission list, and the second application is associated with a second blocked permission list, wherein the first and second blocked permission lists are provided by a user of the operating system and are stored in a blocked permission database;
retrieving the first blocked permission list and the second blocked permission list from the blocked permission database;
determining if the first blocked permission list is a subset of the second blocked permission list;
notifying a reference monitor to create the new instance when the first blocked permission list is determined not to be a subset of the second blocked permission list; and
calculating a new unified blocked permission list that is to be associated with the new instance using the first blocked permission list and the second blocked permission list when the reference monitor is notified to create a new instance.

12. The portable device of claim 11, wherein the instructions to calculate the new unified blocked permission list comprises
to unify the first blocked permission list and the second blocked permission list to form the unified blocked permission list.

13. The portable device of claim 11, the instructions further comprising:
to instruct an instance creation module to create the new instance;
to create the new instance and to associate the new unified blocked permission list to the new instance;
to store the new unified blocked permission list in the blocked permission database.

14. The portable device of claim 13, the instructions further comprising:
to instruct the reference monitor to establish an inter-component communication between the first application and the new instance.

15. The portable device of claim 14, the instructions further comprising:
to intercept a privileged Application Programming Interface (API) request invoked by an application or an instance, wherein the privileged API request is provided with a required permission list;
to retrieve a blocked permission list associated with the invoking application or instance from the blocked permission database;
to determine if the required permission list matches with the retrieved blocked permission list;
to retrieve a permission list associated with the invoking application or instance from a permission database when a match does not exist between the required permission list and the retrieved blocked permission list;
to determine if the required permission list matches with the retrieved permission list; and
to allow the invocation of the privileged Application Programming Interface to proceed when a match exists between the required permission list and the retrieved permission list.

\* \* \* \* \*